United States Patent [19]

Togashi et al.

[11] Patent Number: 4,809,002
[45] Date of Patent: Feb. 28, 1989

[54] MOVING TARGET INDICATOR

[75] Inventors: Fusaji Togashi; Toshihiko Hagisawa, both of Tokyo, Japan

[73] Assignee: NEC Corporation, Tokyo, Japan

[21] Appl. No.: 701,170

[22] Filed: Feb. 13, 1985

[30] Foreign Application Priority Data

Feb. 14, 1984 [JP] Japan ............................... 59-25513

[51] Int. Cl.$^4$ ................................................. G01S 13/54
[52] U.S. Cl. .................................. 342/160; 342/163
[58] Field of Search ......................... 343/7.7, 5 NQ

[56] References Cited

U.S. PATENT DOCUMENTS

| | | | |
|---|---|---|---|
| 3,787,851 | 1/1974 | Hughes | 342/161 |
| 3,962,704 | 6/1976 | Evans | 343/7.7 |
| 4,132,990 | 1/1979 | DiDomizio et al. | 343/7.7 |
| 4,137,533 | 1/1979 | Briechle et al. | 343/7.7 |
| 4,222,049 | 9/1980 | Sirven et al. | 342/160 |
| 4,222,050 | 9/1980 | Kiuchi et al. | 343/7.7 |
| 4,242,682 | 12/1980 | Musha et al. | 343/7.7 |
| 4,394,658 | 7/1983 | Short, III | 343/7.7 |
| 4,463,356 | 7/1984 | Short, III et al. | 343/7.7 |
| 4,513,287 | 4/1985 | Penhard | 342/160 |
| 4,529,985 | 7/1985 | Sawyer et al. | 342/162 |
| 4,616,228 | 10/1986 | Giaccari et al. | 342/160 |
| 4,688,044 | 8/1987 | O'Brien | 342/160 |
| 4,954,511 | 6/1984 | Peters | 342/160 |

OTHER PUBLICATIONS

Merrill I. Skolnik, Radar Handbook 1970, 17-9 through 17-11.

Primary Examiner—T. H. Tubbesing
Assistant Examiner—Hellner: Mark
Attorney, Agent, or Firm—Foley & Lardner, Schwartz, Jeffery, Schwaab, Mack, Blumenthal & Evans

[57] ABSTRACT

A moving target indicator device comprising a first clutter removing circuit for responding to a radar having a variable transmit repetition time and for removing clutter having a Doppler speed of nearly zero from a radar received signal having stationary clutter and moving clutter. The device further includes a correction circuit to keep the amplitude components and the phase components of the first clutter removing circuit output substantially constant. A second clutter removing circuit removes clutter having a constant amplitude component and phase component from the output of the correction circuit.

24 Claims, 4 Drawing Sheets

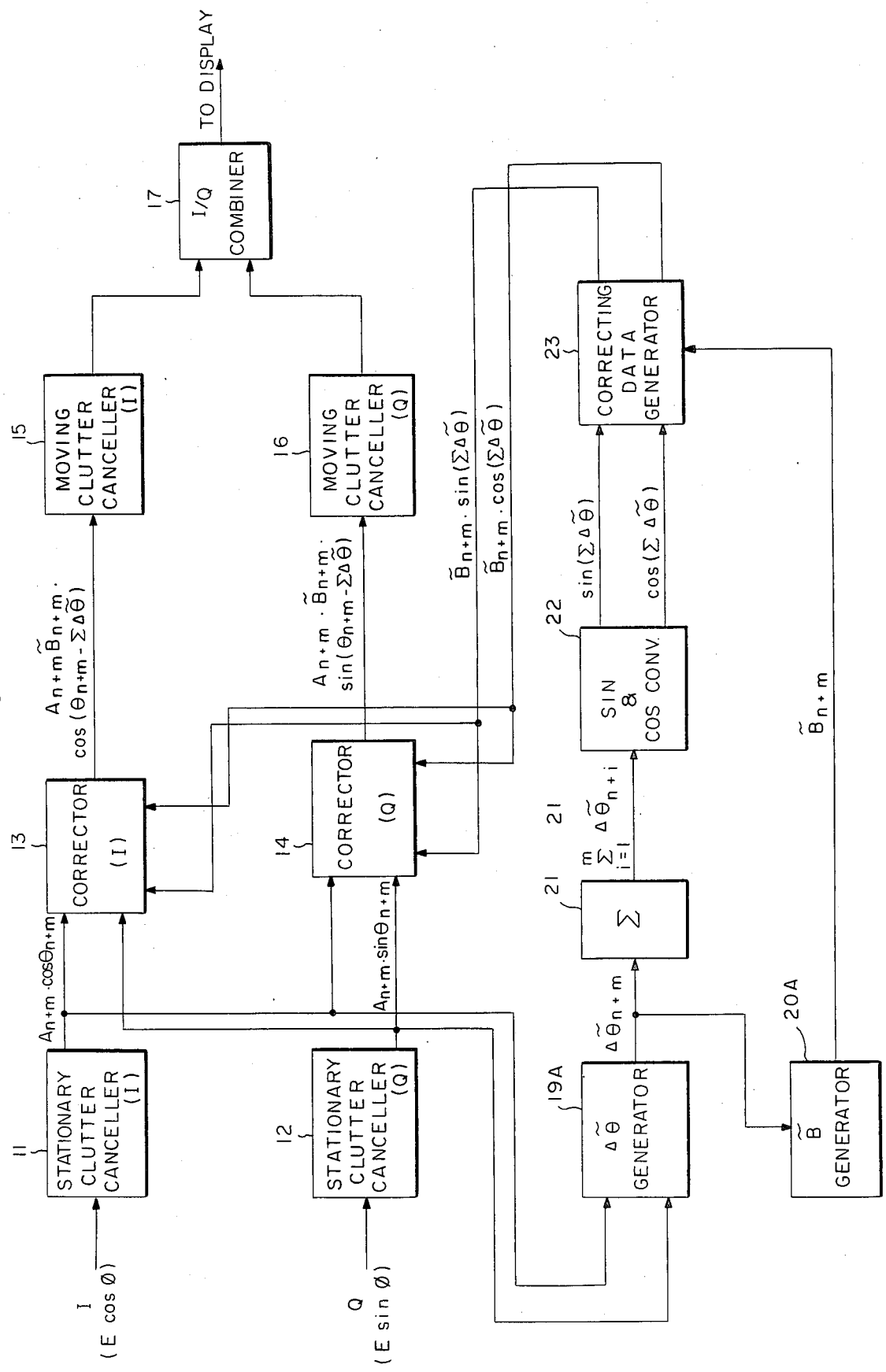

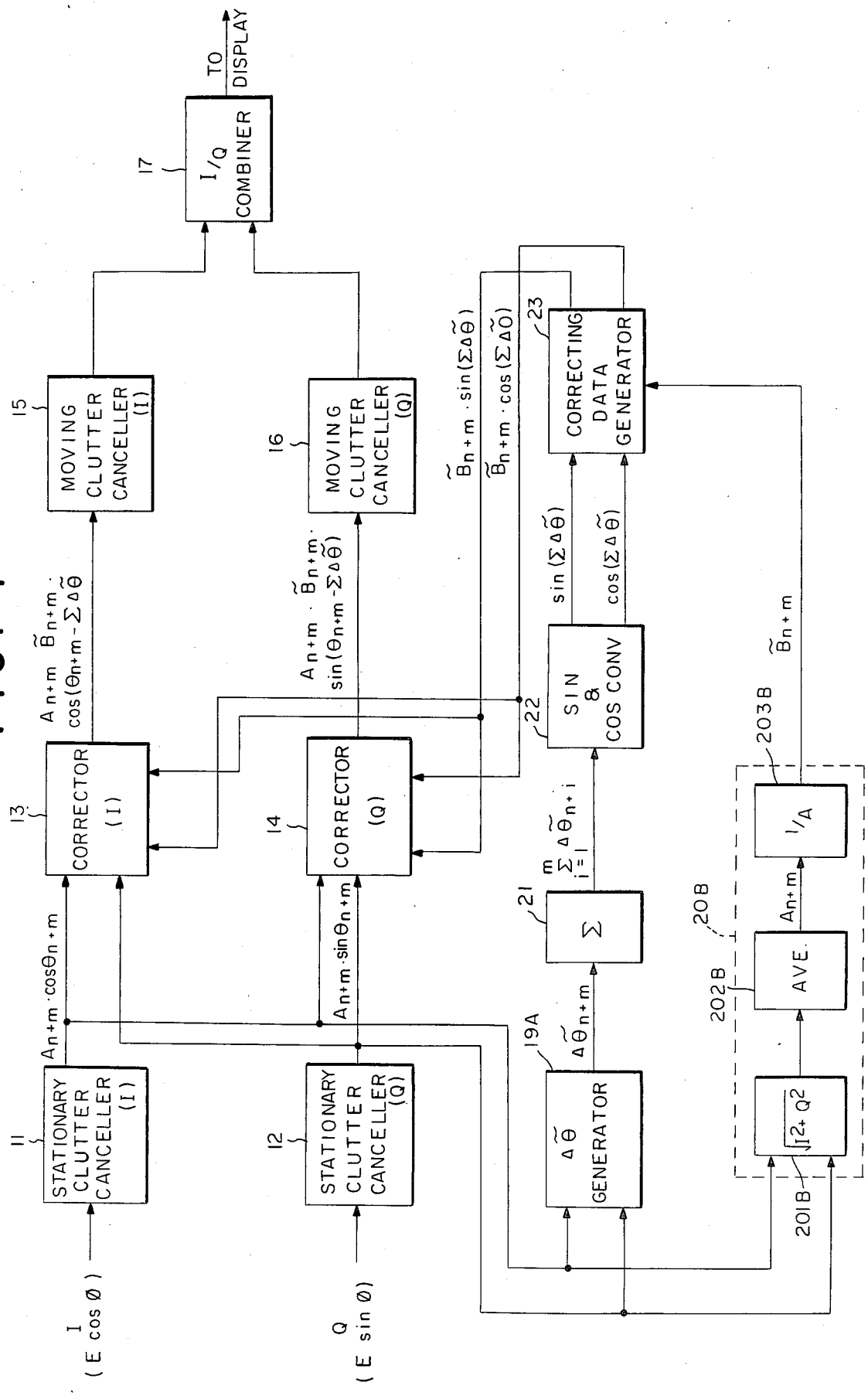

MOVING TARGET INDICATOR

BACKGROUND OF THE INVENTION

The present invention relates to a pulse-radar system and more particularly to a moving target indicator which cancels the unwanted component signal (clutter) in a received signal and detects a moving target signal.

Conventionally, a pulse-radar system indicating a moving target such as an airplane is designed with a clutter-canceller or suppressor to remove stationary (ground) clutter from buildings or other surface irregularities and moving clutter, such as weather clutter from moving reflectors, such as rain or clouds and to detect and indicate the moving target. Among these clutter removing means, a moving target indicator system, hereinafter simply referred to as an MTI, is often used for removing stationary clutter.

Generally, an MTI system adapted as a radar system for detecting and indicating aircraft is used to remove or cancel a signal from a stationary clutter so as to indicate only a moving target. When the phases of transmitted R.F. pulses are compared with the phases of received R.F. pulses, the signal from a stationary clutter always has a constant phase, whereas the signal from a moving target always has a different phase for each pulse repetition period. Hence, phase-detection is carried out in response to signals from the same distance for the continued 2 pulse-repetition periods and the difference between the obtained video signals is taken so as to cancel out the video signal from a stationary clutter and to leave only the video signal corresponding with a moving target. This kind of MTI radar system is described in chapter 17, "RADAR HANDBOOK", edited by Merill Skolnik, McGraw-Hill, U.S.A., 1970.

However, an ordinary MTI system on a moving carrier, such as a ship, cannot cancel out moving clutter from rain, fog, the sea surface, moving ground clutter from land, or the like. This is, because these signals have a different phase for each pulse repetition period, similar to said signals from a moving target.

An adaptive MTI system is suited for cancelling moving clutter, including relatively moving ground clutter as stated before, and for indicating only a moving target such as an airplane. Cancelling an echo from a moving object can be accomplished by varying and transferring Doppler frequency of moving clutter to a notch of an MTI filter. For this kind of conventional adaptive MTI radar system, a clutter-locking MTI system is utilized. The details thereof are described in the chapter 9, "RADAR DESIGN PRINCIPLES" McGraw-Hill, U.S.A., 1969.

A clutter-locking MTI system can remove moving clutter or stationary clutter by detecting an average Doppler frequency (or an average Doppler phase-shift) and locking the average Doppler frequency (or the average Doppler phase-shift) to a notch of the MTI filter. However, when stationary clutter and moving clutter are present, it is not possible to sufficiently remove both because the detected average Doppler frequency, that is, average Doppler phase-shift, is different from that of stationary clutter alone or of moving clutter alone. Further details will be explained in this respect. When both stationary clutter and moving clutter are present, the input signals of the clutter-locking MTI canceller are;

$$V_1 = E_1\sin[2\pi fd_1 t + \phi_0] + E_2\sin[2\pi fd_2 t + \phi_0] \quad (1)$$
$$V_2 = E_1\sin[2\pi fd_1(t + T) + \phi_0] + E_2\sin[2\pi fd_2(t + T) + \phi_0]$$

$\vdots$ where $V_1$ and $V_2$ denote an input signal (radar signal) at the received time point and that after a radar-received repetition time T, respectively. The first and second terms of the equation (1) denote stationary clutter components including the Doppler frequency $fd_1$ (in this case, $fd_1=0$) and moving clutter components including the Doppler frequency $fd_2$, respectively. $E_1$ and $E_2$ denote amplitude components of the stationary clutter and the moving one and $\phi_0$ denotes a phase defined on the basis of the existing location of clutter. Generally, $E_1 \neq E_2$ and $fd_1 \neq fd_2$.

When one input signal is phase-shifted by the presumptive value $\bar{\phi}d = 2\bar{f}dT$ of the average Doppler phase-shift, the canceler output is:

$$\Delta V = 2E_1 \sin[\pi(fd_1-\bar{f}d)T] \cos[2\pi fd_1 t + \phi_0 + \pi(fd_1-\bar{f}d)T] + 2E_2 \sin[\pi(fd_2-\bar{f}d)T] \cos[2\pi fd_2 t + \phi_0 + \pi(fd_2-\bar{f}d)T]$$

where there exists the condition of $\bar{f}d = fd_1 \neq fd_2$ or $\bar{f}d = fd_2 \neq fd_1$. Thus, it is impossible to remove both stationary clutter and moving clutter.

SUMMARY OF THE INVENTION

An object of the present invention is to provide a moving target indicator system which can distinguish a moving target in a region where both stationary clutter and moving clutter are present.

Another object of the present invention is to provide a moving target indicator which can sufficiently remove stationary clutter and moving clutter in a staggered-trigger radar system.

According to the present invention, there is provided a moving target indicator apparatus. The device comprises a first clutter removing means for responding to a radar having a variable transmit repetition time and for removing clutter having a Doppler speed of nearly zero from a radar received signal having stationary clutter and moving clutter. Further, the device includes a correction means to keep the amplitude components and the phase components of the first clutter removing means output substantially constant. A second clutter removing means removes clutter having a constant amplitude component and phase component from the output of the correction means.

Other objects and features of the present invention will be clarified from the following description with reference to the drawings.

BRIEF DESCRIPTION OF THE DRAWINGS

FIG. 3 shows an embodiment for generating amplitude and phase correction data wherein the presumptive value of the average Doppler phase-shift of moving clutter is determined by stationary clutter cancelers.

FIG. 4 shows an embodiment for generating amplitude correction data based on the average amplitude of an input signal.

DETAILED DESCRIPTION OF THE PREFERRED EMBODIMENTS

Figure 1A:
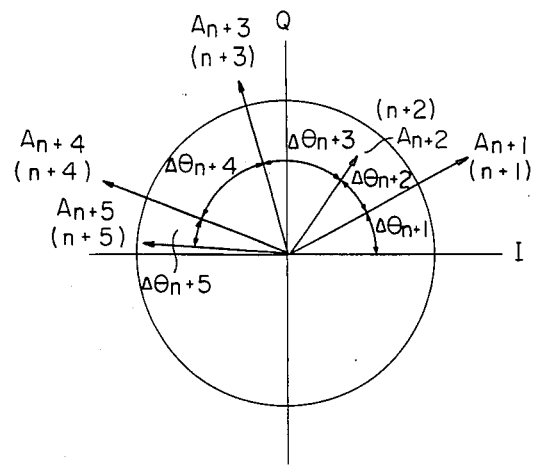
FIG. 1A is a vector diagram of a radar receiving signal.

The present invention has two conventional MTI (stationary clutter removing means i.e., MTI filters) connected in series and a corrector which corrects the phase and amplitude components of the output of a first stage MTI filter in order to detect a moving target in the region where both stationary clutter and moving clutter exist. Specifically, the system according to the present invention includes an MTI canceller for removing the stationary clutter, a clutter-locking MTI canceler for removing the moving clutter not removed by the MTI canceller, and correcting means to correct the amplitude and phase variation caused due to a staggered-trigger system. It is possible to remove moving clutter with the MTI system described above when the radar transmit repetition time is always a constant time T. In practice, however, a staggered PRF MTI (Staggered Pulse Repetition Frequency MTI) system is often employed to improve blind speed by varying radar transmit repetition time. This has the disadvantage that moving clutter cannot be removed because the clutter-locking MTI canceller receives the input signal with a different amplitude-shift and phase-shift due to the repetition time difference. For example, when $T_1$ and $T_2$ are employed as a radar transmit times, stationary clutter and moving clutter signals supplied to the MTI canceller are;

$$V_1 = E_1\sin[2\pi fd_1 t + \phi_0] + E_2\sin[2\pi fd_2 t + \phi_0] \quad (2)$$
$$V_2 = E_1\sin[2\pi fd_1(t + T_1) + \phi_0] + E_2\sin[2\pi fd_2(t + T_1) + \phi_0]$$
$$V_3 = E_1\sin[2\pi fd_1(t + T_1 + T_2) + \phi_0] + E_2\sin[2\pi fd_2(t + T_1 + T_2) + \phi_0]$$

The outputs of the MTI canceler are;

$$\Delta V_1 = V_2 - V_1 \quad (3)$$
$$= 2E_1\sin[\pi fd_1 T_1]\cos[2\pi fd_1 t + \phi_0 + \pi fd_1 T_1] + 2E_2\sin[\pi fd_2 T_1]\cos[2\pi fd_2 t + \phi_0 + \pi fd_2 T_1]$$

$$\Delta V_2 = V_3 - V_2$$
$$= 2E_1\sin[\pi fd_1 T_2]\cos[2\pi fd_1 t + \phi_0 + \pi fd_1(2T_1 + T_2)] + 2E_2\sin[\pi fd_2 T_2]\cos[2\pi fd_2 t + \phi_0 + \pi fd_2(2T_1 + T_2)]$$

Stationary clutter ($fd_1 \approx 0$) can be removed because sin $[\pi fd_1 T_1] \approx 0$, sin $[\pi fd_1 T_2] \approx 0$, however, moving clutter ($fd_2 = 0$) cannot be removed. Therefore, the outputs of the MTI canceller are represented as follows;

$$\Delta V_1 = 2E_2\sin[\pi fd_2 T_1]\cos[2\pi fd_2 t + \phi_0 + \pi fd_2 T_1] \quad (4)$$
$$\Delta V_2 = 2E_2\sin[\pi fd_2 T_2]\cos[2\pi fd_2 t + \phi_0 + \pi fd_2(2T_1 + T_2)]$$

Similarly as stated before, one input signal is phase-shifted by the presumptive value of $$\overline{\phi d} = 2\pi \overline{fd}\left(\frac{T_1 + T_2}{2}\right)$$

of the average Doppler phase-shift of the moving clutter (this input signal is shown as $V_2'$) and is passed through the clutter-locking MTI canceller. The output $\Delta W$ of the clutter-locking MTI is shown:

$$\Delta W = \Delta V_2' - \Delta V_1 \quad (5)$$
$$= 2E_2\sin[\pi fd_2 T_2]\cos[2\pi fd_2 t + \phi_0 + \pi fd_2(2T_1 + T_2) - \overline{\phi d}] - 2E_2\sin[\pi fd_2 T_1]\cos[2\pi fd_2 t + \phi_0 + \pi fd_2 T_1]$$
$$= 2E_2\sin[\pi fd_2 T_2]\cos[2\pi fd_2 t + \pi fd_2 T_1 + \pi(fd_2 - \overline{fd})(T_1 + T_2)] - 2E_2\sin[\pi fd_2 T_1]\cos[2\pi fd_2 t + \phi_0 + \pi fd_2 T_1]$$

Even when $\overline{fd} \approx fd_2$ $$\Delta W = 2E_2(\sin[\pi fd_2 T_2] - \sin[\pi fd_2 T_1])\cos[2\pi fd_2 t + \phi_0 + \pi fd_2 T_1] \quad (6)$$
$$= 4E_2\sin\left[\pi fd_2\left(\frac{T_2 - T_1}{2}\right)\right]\cos\left[\pi fd_2\left(\frac{T_1 + T_2}{2}\right)\right].$$
$$\cos[2\pi fd_2 t + \phi_0 + \pi fd_2 T_1]$$

Hence, moving clutter cannot be removed. In the case that the radar transmit repetition time is constant as $T_1 = T_2 \ (=T)$, it is obvious from the equation (6) that moving clutter can be removed because $$\sin\left[\pi fd_2\left(\frac{T_2 - T_1}{2}\right)\right] = 0.$$

The description stated above can also be applied to a vector processing MTI including an I (in-phase) channel and a Q (quadrature) channel.

As described above, in the staggered PRF MTI system, both the amplitude and the phase of the moving clutter in the output of the MTI canceller are varied with the Doppler frequency response characteristics. Thus, it has been hitherto impossible to remove moving clutter with a clutter-locking MTI.

The present invention is designed to remove moving clutter by correcting the moving clutter having amplitude-shift and phase-shift varied as stated above and supplying the corrected signal to the clutter-locking MTI canceler.

Following is a decription of amplitude-shift and phase shift correction in a triple staggered-trigger mode, where the trigger repetition times are $T_1$, $T_2$, $T_3$.

In a radar signal passed through an MTI canceler (stationary clutter canceler), stationary clutter is removed leaving only moving clutter components. As stated before, the amplitudes and the phases of these moving clutter components vary in every staggered-trigger repetition by virtue of the Doppler frequency response characteristics of the stationary clutter canceler.

The following are the amplitude components $A_{n+1}$, $A_{n+2}$, $A_{n+3}$, $A_{n+4}$ ... (n; natural and positive integer) in every transmit trigger state $(n+1)$, $(n+2)$, $(n+3)$ ... as shown in formula (4).

$$A_{n+1} = 2E_2\sin(\pi fd_2 T_1) \quad (7)$$
$$A_{n+2} = 2E_2\sin(\pi fd_2 T_2)$$
$$A_{n+3} = 2E_2\sin(\pi fd_2 T_3)$$
$$A_{n+4} = 2E_2\sin(\pi fd_2 T_1)$$

The phase-shift components $\Delta\theta_{n+2}$, $\Delta\theta_{n+3}$, $\Delta\theta_{n+4}$, $\Delta\theta_{n+5}$ ... are changed as follows:

$$\Delta\theta_{n+2} = \pi fd_2(T_1 + T_2) \quad (8)$$
$$\Delta\theta_{n+3} = \pi fd_2(T_2 + T_3)$$
$$\Delta\theta_{n+4} = \pi fd_2(T_3 + T_1)$$
$$\Delta\theta_{n+5} = \pi fd_2(T_1 + T_2)$$

Thus, in the trigger state $(n+1)$, $$\left.\begin{array}{l}\text{the } I \text{ channel stationary clutter canceller output is} \\ A_{n+1}\cos\theta_{n+1} \\ \text{and the } Q \text{ channel stationary clutter canceller output is} \\ A_{n+1}\sin\theta_{n+1}\end{array}\right\} \quad (9)$$

where $\theta_{n+1} = 2\pi fd_2 t + \phi_0 + \pi fd_2 T_1 + \pi/2$

The amplitude- and the phase-shift components of the I and Q outputs obtained are corrected so as to have constant values without depending on the stagger-trigger time.

It is assumed that reference amplitude and phase values are given as $A_0$ and $\theta_0$, respectively, and $B_{n+1}$ and $\theta_{n+1}$ are given below:

$$\left.\begin{array}{l} B_{n+1} = \dfrac{A_0}{\sin(\pi fd_2 T_1)} = \dfrac{2E_2 A_0}{A_{n+1}} \\ \Delta\theta_{n+1} = \theta_{n+1} - \theta_0 \end{array}\right\} \quad (10)$$

$$\left.\begin{array}{l}\text{The } I \text{ channel components are expressed as;} \\ A_{n+1}B_{n+1}\cos[\theta_{n+1} - \Delta\theta_{n+1}] = \\ A_{n+1}B_{n+1}[\cos\theta_{n+1} \cdot \cos\Delta\theta_{n+1} + \sin\theta_{n+1} \cdot \sin\Delta\theta_{n+1}] \\ \text{And the } Q \text{ channel components are expressed as;} \\ A_{n+1}B_{n+1}\sin[\theta_{n+1} - \Delta\theta_{n+1}] = \\ A_{n+1}B_{n+1}[\sin\theta_{n+1} \cdot \cos\Delta\theta_{n+1} - \cos\theta_{n+1} \cdot \sin\Delta\theta_{n+1}]\end{array}\right\} \quad (11)$$

Thus, the I and Q channel components have constant of, $2E_2A_0 \cos\theta_0$ respectively and $2E_2A_0 \sin\theta_0$. In other words, the amplitude and phase components are independent of the difference of the Doppler shift $fd_2$ of the moving clutter and the trigger period.

In the next trigger state $(n+2)$, $$\left.\begin{array}{l} B_{n+2} = \dfrac{A_0}{\sin(\pi fd_2 T_2)} = \dfrac{2E_2 A_0}{A_{n+2}} \\ \text{and} \\ \Delta\theta_{n+1} = \theta_{n+1} - \theta_0 \\ \Delta\theta_{n+2} = \theta_{n+2} - \theta_{n+1} \end{array}\right\} \quad (12)$$

are given, and the following corrections similar to those of the previous trigger state, are carried out for the I and Q components.

$$\left.\begin{array}{l} I \text{ components;} \\ A_{n+2}B_{n+2}\cos[\theta_{n+2} - (\Delta\theta_{n+1} + \Delta\theta_{n+2})] = \\ A_{n+2}B_{n+2}[\cos\theta_{n+2} \cdot \cos(\Delta\theta_{n+1} + \Delta\theta_{n+2}) + \sin\theta_{n+2} \cdot \sin(\Delta\theta_{n+1} + \Delta\theta_{n+2})] \\ Q \text{ components;} \\ A_{n+2}B_{n+2}\sin[\theta_{n+2} - (\Delta\theta_{n+1} + \Delta\theta_{n+2})] = \\ A_{n+2}B_{n+2}[\sin\theta_{n+2} \cdot \cos(\Delta\theta_{n+1} + \Delta\theta_{n+2}) - \cos\theta_{n+2} \cdot \sin(\Delta\theta_{n+1} + \Delta\theta_{n+2})]\end{array}\right\} \quad (13)$$

In consideration of equations (12), (13), the following components independent of $fd_2$ and the trigger time are obtained.

I components: $2E_2A_0 \cos\theta_0$
Q components: $2E_2A_0 \sin\theta_0$

Generally, for amplitude and phase correction in the trigger stage $(n+m)$, if $$\left.\begin{array}{l} b_{n+m} = \dfrac{A_0}{\sin(\pi fd_2 Tj)} = \dfrac{2E_2 A_0}{A_{n+m}} \\ Tj = T_1; m = 1, 4, 7, \ldots \\ Tj = T_2; m = 2, 5, 8, \ldots \\ Tj = T_3; m = 3, 6, 9, \ldots \end{array}\right\} \quad (14)$$

are assumed, the following corrections are required:

for the I components, $$A_{n+m}B_{n+m}\left[\cos\theta_{n+m} - \left(\sum_{i=1}^{m}\Delta\theta_{n+i}\right)\right] =$$

$$A_{n+m}B_{n+m}\left[\cos\theta_{n+m}\cdot\cos\left(\sum_{i=1}^{m}\Delta\theta_{n+i}\right) + \sin\theta_{n+m}\cdot\sin\left(\sum_{i=1}^{m}\Delta\theta_{n+i}\right)\right]$$

for the Q components, $$A_{n+m}B_{n+m}\sin\left[\theta_{n+m} - \left(\sum_{i=1}^{m}\Delta\theta_{n+i}\right)\right] =$$

$$A_{n+m}B_{n+m}\left[\sin\theta_{n+m}\cdot\cos\left(\sum_{i=1}^{m}\Delta\theta_{n+i}\right) + \cos\theta_{n+m}\cdot\sin\left(\sum_{i=1}^{m}\Delta\theta_{n+i}\right)\right]$$

(15)

As a result, both components will be expressed as;

I components: $2E_2A_0\cos\theta_0$

Q components: $2E_2A_0\sin\theta_0$ These components can be regarded as stationary clutter. Since the Doppler frequency $fd_2$ of the moving clutter is unknown, the presumptive value $\overline{fd}$ thereof is utilized as the corrected signal. The corrected component signals are made to pass through the clutter-locking MTI canceller to remove moving clutter.

Figure 1B:
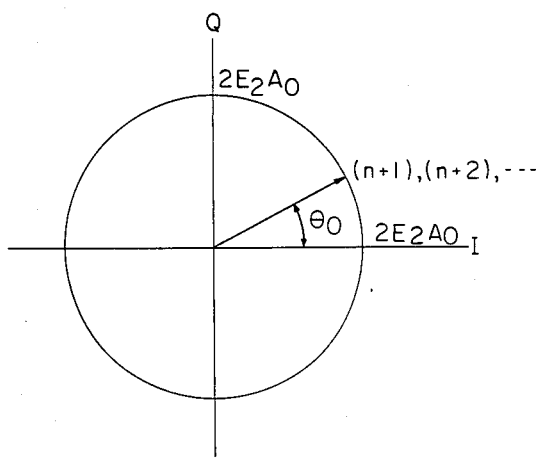
FIG. 1B is a vector diagram of signals obtained through frequency correction.

FIG. 1 is a vector diagram showing the above-stated relationship. In FIG. 1A, $A_{n+1}$, $A_{n+2}$, $A_{n+3}$, $A_{n+4}$, $A_{n+5}$ denote the signal amplitudes in the trigger states (n+1), (n+2), (n+3), (n+4), (n+5), respectively, and $\Delta\theta_{n+1}$, $\Delta\theta_{n+2}$, $\Delta\theta_{n+3}$, $\Delta\theta_{n+4}$, $\Delta\theta_{n+5}$ the phase-shifts from the signals in one previous trigger states for the trigger states (n+1) (n+2), (n+3), (n+4), (n+5), respectively. As described above, shifting the phases of the states (n+1), (n+2), (n+3) and (n+4) by $\Delta\theta_{n+1}$, $\Delta\theta_{n+1}+\Delta\theta_{n+2}$, $\Delta\theta_{n+1}+\Delta\theta_{n+2}+\Delta\theta_{n+3}$, and $\Delta\theta_{n+1}+\Delta\theta_{n+2}+\Delta\theta_{n+3}+\Delta\theta_{n+4}$ makes signals with the stationary phase $\theta_0$. The varying amplitudes in every trigger state can also be made constant by correcting with $B_{n+m}$ in equation (14). In other words, correction on the basis of equation (15) is accomplished in the present invention. FIG. 1B shows a vector diagram of the signals obtained through the phrase and amplitude correction. In each state, the amplitudes and the phases of the signals are made to be constant values $2E_2A_0\sin\theta_0$.

Now, one embodiment of the present invention will be described in consideration of the principle of this invention.

Figure 2:
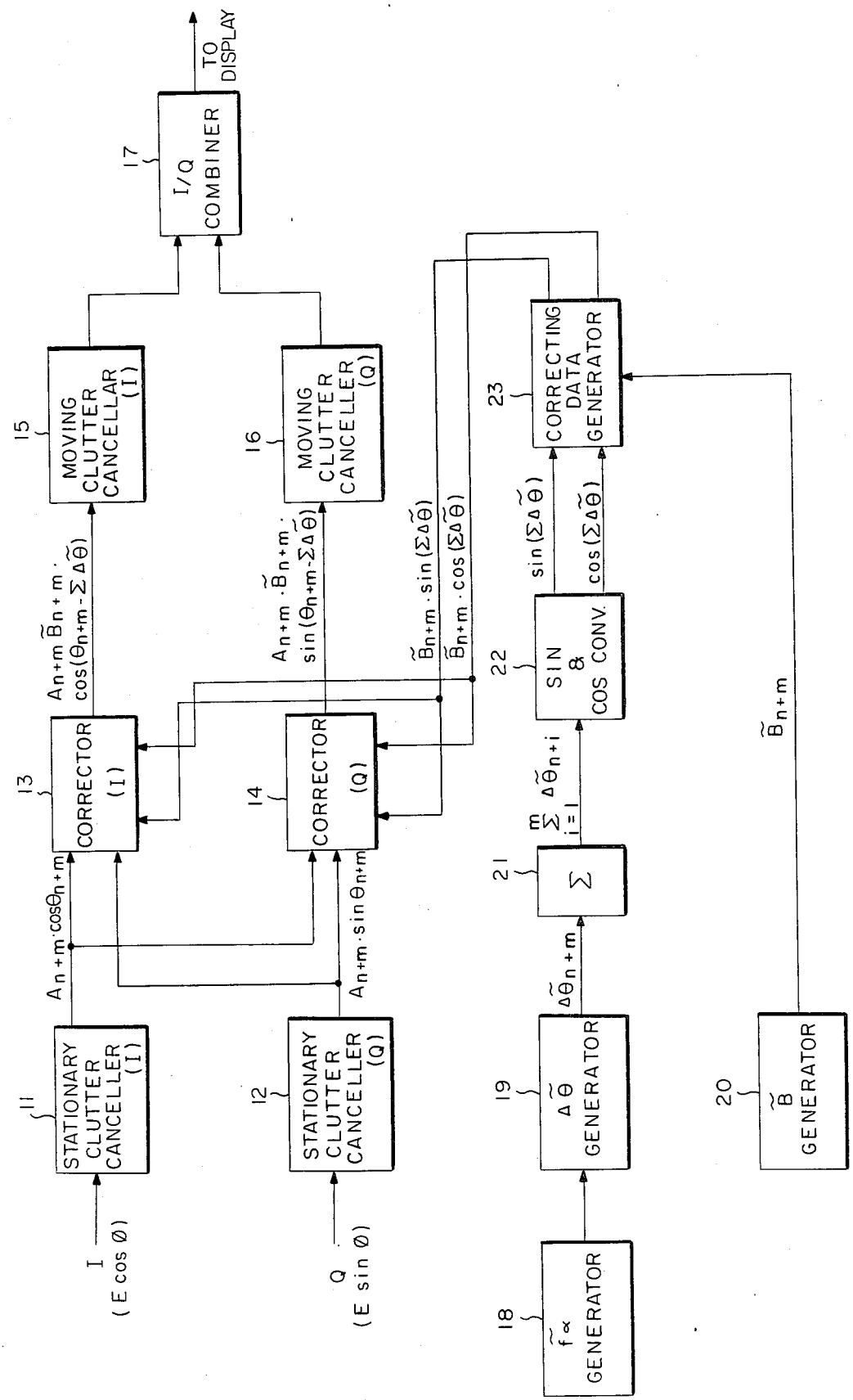
FIG. 2 shows an embodiment for generating amplitude and phase correction data by manually setting the presumptive value of the average Doppler phase shift of moving clutter.

Referring to FIG. 2, stationary clutter cancelers 11 and 12, composed of the well-known delay circuit and subtractor circuit, remove stationary clutter from the signals $I_{in}$ (I component given as $E\cos\phi$) and $Q_{in}$ (Q component given as $E\sin\phi$). The I component signal and the Q component signal from which stationary clutter has been removed (i.e., stationary clutter-free signals) are expressed as $A_{n+m}\cdot\cos\theta_{n+m}$ and $A_{n+m}\cdot\sin\theta_{n+m}$, respectively.

Amplitude and phase correctors 13 and 14 correct the input signal on the basis of equation (15) to obtain a signal with constant amplitude and phase and supplies the corrected signal to the moving clutter cancelers 15 and 16. The moving clutter cancelers 15 and 16, comprising the same circuit as the stationary clutter cancelers 11 and 12, remove the corrected moving clutter. Then, the I and Q component signals from which the stationary clutter and the moving clutter have been removed are combined in a I/Q combiner 17 and the combined signal is output to a display (not shown) as an indication video signal.

A phase-correcting data generator 19 generates a phase-variation signal $\Delta\overline{\theta}_{n+m}$ in each trigger repetition period, due to the differences in duration of the trigger repetition periods. The correction signal $\Delta\theta_{n+m}$ corresponds to the average Doppler frequency fd which is related to moving clutter velocity. An amplitude-correcting data generator 20 similarly generates a correction signal $B_{n+m}$ to normalize the amplitude varied in every trigger repetition at a predetermined value. An integrator 21 integrates the phase-variation signal $\Delta\overline{\theta}_{n+m}$ in every trigger repetition which is output from the phase-correcting data generator 19 and outputs the signal $$\sum_{i=1}^{m}\Delta\overline{\theta}_{n+i}$$

in equation (15). A SIN&COS converter 22 generates SIN ($\Sigma\Delta\overline{\theta}$) and COS ($\Sigma\Delta\overline{\theta}$) in response to the integrating data $$\Sigma\Delta\overline{\theta}\left(=\sum_{i=1}^{m}\Delta\overline{\theta}_{n+i}\right).$$

A correcting data generator 23 transmits correcting data $\overline{B}_{n+m}\cdot\sin(\Sigma\Delta\overline{\theta})$ and $\overline{B}_{n+m}\cdot\cos(\Sigma\Delta\overline{\theta})$ to the amplitude and phase correctors 13 and 14 in response to the outputs from the amplitude-correcting data generator 20 and the SIN&COS converter 22.

There will now be described an example of manually setting a presumptive value $\overline{fd}$ of the average Doppler frequency ($fd_2$) of the moving clutter. For example, a radar operator watches a video indicator displaying the output of the I/Q combiner on the radar screen and arranges the output from a presumptive Doppler frequency ($\overline{fd}$) generator 18 to reduce clutter on the screen as much possible. $\overline{fd}$ from the $\overline{fd}$ generator 18 is fixed at a suitable frequency minimizing clutter on the screen.

The phase-correcting data generator 19 sets a reference phase value $\theta_0$ equal to $\theta_{n+1}$. The phase variation (presumptive value) $\Delta\overline{\theta}_{n+1}$ generated in the trigger state (n+1) is therefore $\Delta\overline{\theta}_{n+1}=\theta_{n+1}-\theta_0=0$. Using the well-known data $\overline{fd}$, $T_1$, $T_2$, $T_3$, the generator 19 generates the following variations (presumptive values):

$$\begin{aligned}
&\text{in the trigger state } (n+2): \\
&\Delta\overline{\theta}_{n+2} = \pi\overline{fd}(T_1 + T_2)[\approx \theta_{n+3} - \theta_{n+1}] \\
&\text{in the trigger state } (n+3): \\
&\Delta\overline{\theta}_{n+3} = \pi\overline{fd}(T_2 + T_3)[\approx \theta_{n+2} - \theta_{n+2}] \\
&\text{in the trigger state } (n+4): \\
&\Delta\overline{\theta}_{n+4} = \pi\overline{fd}(T_3 + T_1)[\approx \theta_{n+4} - \theta_{n+3}] \\
&\cdot \\
&\cdot \\
&\cdot
\end{aligned}$$

(16)

The amplitude-correcting data generator 20 generates the following data to correct the amplitude variation in each state:

The amplitude-correcting value (presumptive value) $\overline{B}_{n+1}$ in the trigger state (n+1) is:

$$\left.\begin{array}{l} \overline{B}_{n+1} = \dfrac{A_0}{\sin(\pi f d T_1)} \left[ \simeq \dfrac{A_0}{\sin(\pi f d_2 T_1)} \right] \\[4pt] \text{in the trigger state } (n+2): \\[4pt] \overline{B}_{n+2} = \dfrac{A_0}{\sin(\pi f d T_2)} \left[ \simeq \dfrac{A_0}{\sin(\pi f d_2 T_2)} \right] \\[4pt] \text{in the trigger state } (n+3): \\[4pt] \overline{B}_{n+3} = \dfrac{A_0}{\sin(\pi f d T_3)} \left[ \simeq \dfrac{A_0}{\sin(\pi f d_2 T_3)} \right] \\[4pt] \text{in the trigger state } (n+4): \\[4pt] \overline{B}_{n+4} = \dfrac{A_0}{\sin(\pi f d T_1)} \left[ \simeq \dfrac{A_0}{\sin(\pi f d_2 T_1)} \right] \\[4pt] \vdots \end{array}\right\} \quad (17)$$

As is clear from the equations (15) to (17), the amplitude and phase correctors 13 and 14 give the moving clutter signal with constant amplitude and phase through processing for the amplitude component:

$$A_{n+m} \cdot \overline{B}_{n+m} = 2E_2 \sin(\pi f d_2 Tj) \dfrac{A_0}{\sin(\pi f d Tj)}$$
$$\simeq 2E_2 A_0.$$

and through the processing for the phase component:

$$\cos\theta_{n+m} \cdot \cos(\Sigma\Delta\overline{\theta}) + \sin\theta_{n+m} \cdot \sin(\Sigma\Delta\overline{\theta}) = \cos(\theta_{n+m} - \Sigma\Delta\overline{\theta})$$
$$= \cos(\theta_{n+m} - \Sigma\Delta\theta)$$
$$= \cos\theta_0$$
$$\sin\theta_{n+m} \cdot \cos(\Sigma\Delta\overline{\theta}) + \cos\theta_{n+m} \cdot \sin(\Sigma\Delta\overline{\theta}) = \sin(\theta_{n+m} - \Sigma\Delta\overline{\theta})$$
$$= \sin(\theta_{n+m} - \Sigma\Delta\theta)$$
$$= \sin\theta_0$$

The embodiment shown in FIG. 2 discloses an example of generating amplitude and phase correction data through a manual operation, however, it is possible to automatically design the construction of generating the correction data.

FIG. 3 shows the embodiment where the correction data is generated on the basis of the presumptive value $\theta_{n+m}$ of the average Doppler phase-shift of the moving clutter determined by the outputs of stationary clutter cancelers 11 and 12. In FIG. 3, the same numerals as in FIG. 2 denote the same constituent elements therewith. Only the difference between the embodiments shown in FIGS. 2 and 3 will be described. A phase-correcting data generator 19A determines the phase-shift $\Delta\theta_{n+m}$ by utilizing the I and Q component signals of the outputs of the cancelers 11, 12 in the trigger states (n+m) and (n+m−1) according to the following equation.

$$\Delta\theta_{n+m} = \theta_{n+m} - \theta_{n+m-1} \qquad (18)$$
$$= \tan^{-1}\left[\dfrac{A_{n+m} \cdot \sin\theta_{n+m}}{A_{n+m} \cdot \cos\theta_{n+m}}\right] -$$
$$\left[\dfrac{A_{n+m-1} \cdot \sin\theta_{n+m-1}}{A_{n+m-1} \cdot \cos\theta_{n+m-1}}\right]$$

Next, the presumptive value $\Delta\overline{\theta}_{n+m}$ ($\simeq \Delta\theta_{n+m}$) of the average Doppler phase-shift of the moving clutter in the distance $R_0$ is given as:

$$\Delta\overline{\theta}_{n+m} = \dfrac{1}{N} \sum_{r=-\frac{N}{2}}^{\frac{N}{2}} [\Delta\theta_{n+m}]_{R_0+r} \qquad (19)$$

Here, the average of N samples of the moving clutter phase-shift between the distance ($R_0-N/2$) and ($R_0+N/2$) in the transmit trigger state (n+m), except the distance $R_0$, is regarded as the presumptive value of the average Doppler phase-shift of the moving clutter. The same processing with the embodiment shown in FIG. 2 is carried out to obtain an integrated value, SIN component and COS component from the obtained presumptive value $\Delta\overline{\theta}_{n+m}$.

An amplitude-correcting data generator 20A determines $$\overline{B}_{n+m} = \dfrac{A_0}{\sin\left(\Delta\overline{\theta}_{n+m} \dfrac{Tj}{T_{j-1} + Tj}\right)}$$
$$= \dfrac{A_0}{\sin(\pi f d Tj)}$$

according to $\Delta\theta_{n+m} = \pi f d(T_{j-1}+Tj)$ in response to $\Delta\overline{\theta}_{n+m}$ obtained in the phase-correcting data generator 19A, and then supplies it to a correcting data generator 23.

FIG. 4 is the composition block of another embodiment for generating correction data. In this embodiment, the phase-correcting data generator 19A is identical with that of the embodiment shown in FIG. 3, however, the amplitude-correcting data generating method is different from that in FIG. 3.

An amplitude-correcting data generator 20B is composed of an amplitude calculator 201B, an averaging circuit 202B and a reciprocal number calculating circuit 203B. The amplitude calculator 201B develops $$\sqrt{(A_{n+m}\cos\theta_{n+m})^2 + (A_{n+m}\sin\theta_{n+m})^2}$$
$$r \neq 0$$

in response to receipt of the I components ($A_{n+m} \cdot \cos\theta_{n+m}$) and Q components ($A_{n+m} \cdot \sin\theta_{n+m}$) and then provides this output as amplitude components. The averaging circuit 202B develops the average amplitude value $\overline{A}_{n+m}$ ($\simeq A_{n+m}$) in response to receipt of those amplitude components according to the equation;

$$\overline{A}_{n+m} = \dfrac{1}{N} \sum_{r=-\frac{N}{2}}^{\frac{N}{2}} [\sqrt{(A_{n+m}\cos\theta_{n+m})^2 + (A_{n+m}\sin\theta_{n+m})^2}]_{R_0+r}$$

Next, the reciprocal number calculator 203B provides the output of the amplitude-correcting data generator 20B as the reciprocal number of $\overline{A}_{n+m}$ or $$\overline{B}_{n+m} = \frac{A_0}{\overline{A}_{n+m}}$$

and supplies it to the correcting data generator 23.

When the outputs of the cancelers 11 and 12 are corrected according to the correction data obtained as stated above, the phase components and the amplitude components are kept constant so that moving clutter is removed by the moving clutter cancelers 15 and 16.

What is claimed is:

1. A moving target indicator apparatus for removing stationary and moving clutter from a radar received signal received in response to a transmitted signal having a varied transmit repetition time comprising:
   a first clutter removing means for removing stationary clutter from said radar received signal and generating a first signal having varying amplitude and phase cmponents;
   a correction means responsive to said first clutter removing means for correcting the moving clutter of said first signal having varying amplitude and phase components and producing a corrected signal having a constant amplitude and a constant phase based upon the varied transmit repetition time; and
   a second clutter removing means responsive to said correction means for removing the moving clutter from said corrected signal and generating a second signal.

2. The apparatus of claim 1, further comprising a display means for displaying said second signal.

3. The apparatus of claim 1, wherein
   said first clutter removing means comprises a means for removing the stationary clutter from an in-phase component of said radar received signal and a means for removing the stationary clutter from a quadrature component of said radar received signal;
   said correction means comprises a means for correcting an in-phase component of said first signal and a means for correcting a quadrature component of said first signal; and
   said second clutter removing means comprises a means, producing a first output signal, for removing the moving clutter from an in-phase component of said corrected signal and a means, producing a second output signal, for removing the moving clutter from a quadrature component of said corrected signal.

4. The apparatus according claim 3, further comprising combination means for combining said first output signal and said second output signal.

5. The apparatus according to claim 1, wherein said correction means comprises;
   phase-correcting means for generating a phase variation signal $\Delta\tilde{\theta}$ each repetition time of a radar trigger;
   amplitude-correcting means for generating an amplitude-correcting data signal $\overline{B}$ each repetition time for adjusting an amplitude variation of said first signal; and
   integrator means for integrating said phase variation signal $\Delta\tilde{\theta}$ and outputting an integrated phase variation signal $\Sigma\Delta\tilde{\theta}$ as a reference data signal for phase correction.

6. The apparatus according to claim 5, further comprising converter means for generating a sine component and a cosine component of said integrated value signal $\Sigma\Delta\theta$; and
   correcting data generator means, responsive to said converter means and said amplitude correcting means, for generating correction data.

7. The apparatus according to claim 5 further comprising presumptive Doppler frequency generator means for outputting a presumptive Doppler frequency signal fd, within a predetermined range, to said phase-correcting means.

8. The apparatus according to claim 7, wherein said presumptive Doppler frequency generator means is connected to an input of said amplitude-correcting means.

9. The apparatus according to claim 5, wherein said amplitude-correcting data signal $\overline{B}$ is a function of the average Doppler frequency of said moving clutter, the trigger repetition time, and the present trigger time.

10. The apparatus according to claim 1, wherein said correction means comprises a means for detecting a phase-shift, of said radar received signal, between successive repetition times; and
    a means for generating an average Doppler phase-shift signal $\Delta\overline{\theta}$
    wherein phase components of said first signal are corrected in response to said average.

11. The apparatus according to claim 1, wherein said correction means comprises a means for determining an average amplitude value $\overline{A}$ of said first signal; and
    a means for generating an amplitude correction signal inversely proportional to said average.

12. The apparatus of claim 7, wherein said Doppler frequency generator means further comprises a means for adjusting said Doppler frequency signal $\tilde{f}d$ to a fixed value.

13. The apparatus of claim 10, wherein amplitude components of said first signal are corrected in response to said average.

14. The apparatus of claim 5, wherein said phase-correcting signal corresponds to an average Doppler frequency $\tilde{f}d$ related to the velocity of said moving clutter.

15. A method for removing stationary and moving clutter from a radar received signal received in response to a transmitted signal having a varied transmit repetition time, comprising the steps of:
    (a) removing stationary clutter from said signal to produce a stationary clutter-free signal having varying amplitude and phase components;
    (b) adjusting the moving clutter of said stationary clutter-free signal to obtain a corrected signal having constant phase and constant amplitude based upon the varied transmit repetition time; and
    (c) removing the moving clutter from said corrected signal.

16. The method of claim 15, wherein said step of removing stationary clutter comprises:
    (a) separating said received signal into an in-phase component and a quadrature component; and
    (b) removing stationary clutter from said in-phase component and said quadrature component.

17. The method of claim 16, wherein said step of adjusting the moving clutter of said stationary clutter-free signal comprises adjusting said in-phase component to have a constant phase and constant amplitude and adjusting said quadrature component to have a constant phase and constant amplitude.

18. The method of claim 17, wherein said step of removing moving clutter comprises removing moving clutter from said in-phase component of said signal and removing moving clutter from said quadrature component of said signal.

19. The method of claim 18, further comprising the step of combining said in-phase component and said quadrature component.

20. The method of claim 15, wherein the step of adjusting the moving clutter of said stationary clutter-free signal comprises:
 (i) generating a phase variation signal each transmit repetition time;
 (ii) generating an amplitude correcting signal each transmit repetition time;
 (iii) integrating said phase variation signal; and
 (iv) adjusting the moving clutter of said stationary clutter-free signal in response to said integrated signal and said amplitude correcting signal.

21. The method 20, wherein said phase variation signal corresponds to an average Doppler frequency related to the velocity of said moving clutter.

22. The method of claim 20, wherein the step of adjusting the moving clutter of said stationary clutter-free signal in response to said integrated signal and said amplitude correcting signal comprises:
 (a') generating a sine component and a cosine component of said integrated signal;
 (b') adjusting the moving clutter of said stationary clutter-free signal in response to said sine component, said cosine component, and said amplitude correcting signal.

23. The method of claim 15, wherein said step of adjusting the moving clutter of said stationary clutter-free signal comprises:
 (i) detecting a phase shift of said radar signal between successive repetition times;
 (ii) calculating an average Doppler phase shift; and
 (iii) adjusting the moving clutter of said stationary clutter-free signal in response to said average.

24. The method of claim 15, wherein said step of adjusting the moving clutter of said stationary clutter-free signal comprises:
 (i) calculating an average amplitude of said stationary clutter-free signal;
 (ii) generating an amplitude correction signal inversely proportional to said average; and
 (iii) adjusting the moving clutter of said stationary clutter-free signal in response to said amplitude correction signal.

* * * * *